Dec. 19, 1967  L. D. YATES  3,359,478
SILICON CONTROLLED PHASE LOCKED SERVO DRIVE
Filed Aug. 3, 1965
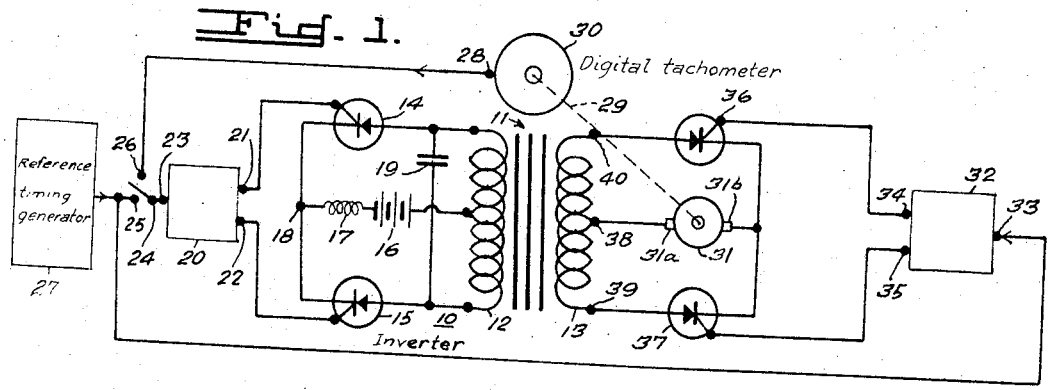
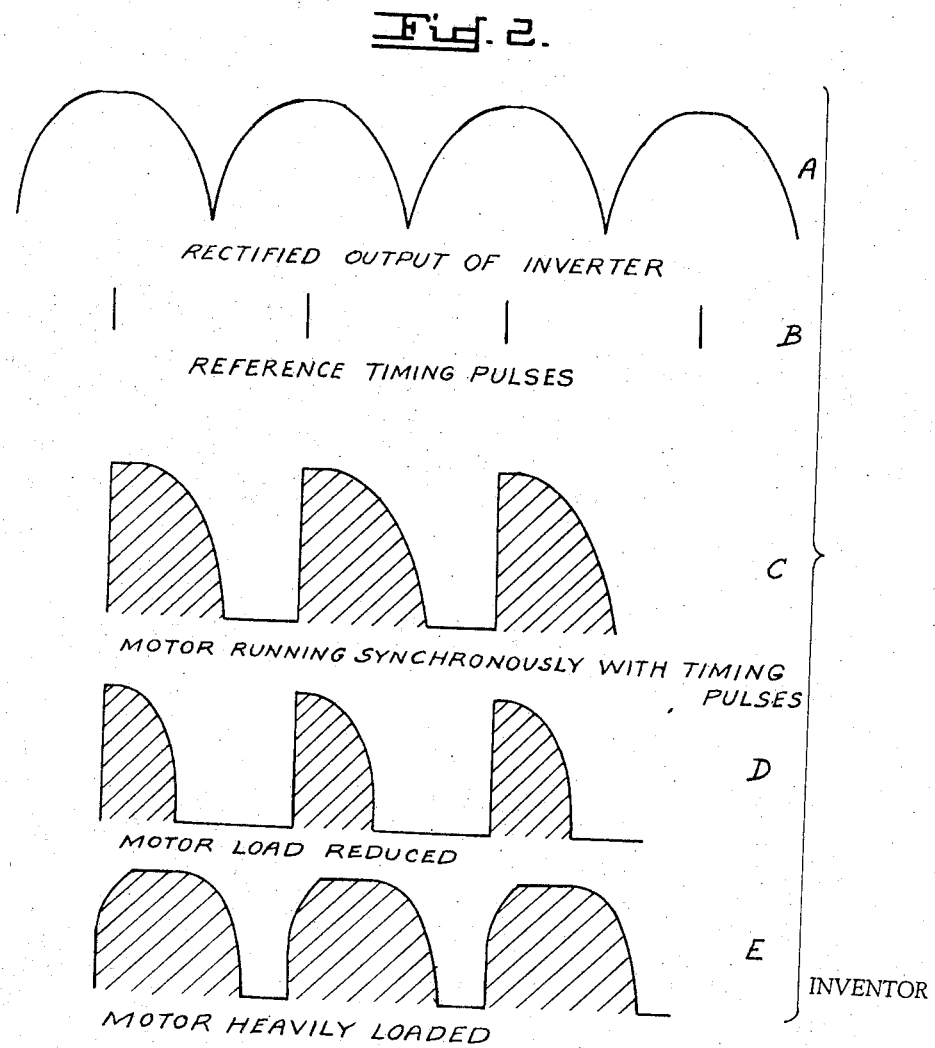
INVENTOR
Lowell D. Yates
BY: Harry M. Saragovitz,
Edward J. Kelly &
A. J. DuPont
ATTORNEYS United States Patent Office 3,359,478
Patented Dec. 19, 1967

3,359,478
SILICON CONTROLLED PHASE LOCKED
SERVO DRIVE
Lowell D. Yates, El Paso, Tex., assignor to the United
States of America as represented by the Secretary of
the Army
Filed Aug. 3, 1965, Ser. No. 477,042
3 Claims. (Cl. 318—314)

The invention described herein may be manufactured and used by or for the Government for governmental purposes, without the payment to me of any royalty thereon.

This invention relates to servo drive circuit means and more particularly to a silicon-controlled rectifier phase locked servo drive circuit consisting of a conventional silicon controlled rectifier inverter triggered in a unique manner by the loop phase error producing in the inverter transformer secondary an AC voltage which is full wave rectified by two silicon controlled rectifiers triggered by a reference timing means.

An object of the invention is a silicon-controlled rectifier phase locked servo drive wherein a completely variable relationship between timing signals and shaft position signals exists without lock-up of the motor drive silicon-controlled rectifiers whereas conventional silicon-controlled rectifier inverter or flip-flop drive circuits will lock-up or fail when there is a coincidence or near-coincidence of timing and tachometer signals.

Another object of the invention is a silicon-controlled rectifier phase locked servomotor drive system employing a conventional silicon-controlled rectifier inverter triggered alternatively by odd and even shaft position pulses coupled to the two primary connected silicon-controlled rectifiers whereby there is induced in the secondary an AC voltage whose cross over points are a function of shaft position and wherein a pair of silicon-controlled rectifiers connected in the output of the inverter as full wave controlled rectifiers for supplying power to the servomotor are alternately triggered by a reference timing signal.

The specific nature of the invention as well as other objects and advantages thereof will clearly appear from the following description and accompanying drawings in which:

FIGURE 1 is a schematic circuit diagram of a preferred embodiment of the invention; and FIGURE 2 is a series of graphs illustrating the reference timing pulses and the relationship of power applied to the motor under various load conditions and motor synchronization in regard to the reference timing pulses.

Referring to FIGURE 1, 10 indicates an inverter consisting of transformer 11 formed with a primary winding 12 and secondary or output winding 13. Commutating capacitor 19 is connected across the primary winding 12. Silicon-controlled rectifier 14 has its anode connected to one terminal of primary winding 12 and silicon-controlled rectifier 15 has its anode connected to the opposite terminal of primary winding 12. A potential source 16 has its positive pole connected to the center tap of primary winding 12 and its negative pole connected to the cathodes of silicon-controlled rectifiers 14 and 15 through an inductance 17. In order to clarify the invention a brief description of how the inverter operates follows. Assume silicon-controlled rectifier 14 is conducting and silicon-controlled rectifier 15 is blocking. Then current from the potential source 16 flows through the upper half of the primary 12 as viewed from FIGURE 1. Autotransformer action then produces a voltage of about twice the value of the potential source 16 at the anode of silicon-controlled rectifier 15 charging commutating capacitor 19 to approximately twice the value of the potential source 16. When silicon-controlled rectifier 15 is triggered the junction 18 rises to approximately twice the potential of potential source 16 whereby silicon-controlled rectifier 14 is reversed biased and rendered non-conductive. Commutating capacitor 19 now maintains the reverse biased for the required turn-off time. When silicon-controlled rectifier 14 is again triggered, as will be subsequently disclosed, the inverter returns to the first state. It is now apparent that the DC supply current from source 16 flows alternately through each side of the primary winding 12 whereby a square wave of AC voltage is produced across the secondary winding 13. A bi-stable multivibrator 20, has its output terminals 21–22 connected to the gates of silicon-controlled rectifiers 14–15, respectively. The input terminal 23 is connected to the switch blade of switch 24. Contact 25 of switch 24 is connected to the output of reference timing generator 27 and contact 26 is connected to the output terminal 28 of digital tachometer 30 which is mechanically linked to electric motor 31 as indicated by the dashed line 29. The output of reference timing generator 27 is also coupled to the input of a second bi-stable multivibrator 32, as indicated by reference numeral 33. The output terminals 34–35 of bi-stable multivibrator 32 are coupled to the gates of silicon-controlled rectifiers 36 and 37, respectively. The secondary winding 13 of the inverter transformer 11 is provided with a center tap 38 which is connected to terminal 31a of motor 31 which has its other terminal 31b connected to the cathodes of silicon-controlled rectifiers 36 and 37. The outer ends 40 and 39 of winding 13 are connected to the anodes of silicon-controlled rectifiers 36 and 37, respectively.

Upon switching the blade of switch 24 to contact 25, the reference timing generator 27 triggers the bi-stable multivibrator 20 to produce set and reset pulses which alternately gate silicon-controlled rectifiers 14 and 15 of the inverter 10. The frequency of the AC output of transformer secondary winding 13 is one half that of the reference timing generator 27. However, since silicon-controlled rectifiers 14 and 15 and silicon-controlled rectifiers 36–37 are simultaneously triggered by the reference timing generator 27, the rectifiers 36 and 37 function as full wave rectifiers and apply maximum full wave rectified power to the DC motor 31. The frequency of the pulses of DC power thus applied to the motor is equal to the frequency of and in-phase with the reference timing generator 27. After motor 31 has obtained approximate normal velocity, the blade of switch 24 is switched to contact 26 whereupon the output of digital tachometer 30 is coupled to and triggers the bi-stable multivibrator 20. Although a manual switch 24 is shown and described for the sake of simplicity, it is to be understood that more sophisticated switching is within the comprehension of the invention such as a velocity sensing means in combination with automatic switching means may be employed in place of the manual switch. Since the digital tachometer 30 is mechanically coupled to the shaft of motor 31, the velocity and position of the shaft of motor 31 will determine the frequency and phase of the output of inverter 10. As the reference timing signal generated by generator 27 continues to control the turn-off of silicon-controlled rectifiers 14 and 15, adjustment to correct the amount of power to achieve and maintain motor synchronism with the reference timing is automatic. This is illustrated in FIGURE 2 wherein graph C shows the motor running synchronously with the reference timing. If the motor load decreases, the motor shaft velocity will increase advancing the phase of the inverter output, as illustrated in graph D of FIGURE 2, which brings the turn-off point in the cycle closer to the timing or the turn-on pulse thus reducing the power and consequently the torque output of the motor shaft. An increase in the motor's shaft load would retard the phase of the inverter output causing the turn-off portion of the cycle to fall further behind the timing or turn-on pulses resulting in the automatic increase of power to the motor as shown in graph E of FIGURE 2.

The silicon-controlled rectifier phased locked servo drive of the invention provides a feedback parameter of shaft position and velocity without a requirement for capacitor commutation of the silicon-controlled rectifiers at a variable pulse width. The only capacitor commutation of the silicon-controlled rectifiers is in the inverter circuit and here the input waveform is symmetrical with approximately equal turn-on and turn-off periods which minimizes the lock-up problem. There are also no lock-up problems in the motor drive circuit since the silicon-controlled rectifiers 36 and 37 are turned off by a complete reversal of the applied voltage every half cycle regardless of the power commutated.

The following is a description of one complete cycle of operation. The blade of switch 24 is placed in contact with contact 25 whereby the reference timing signals, pulses, generated by reference timing generator 27 are applied alternately to the gates of silicon-controlled rectifiers 14 and 15 of the inverter 10 by means of bi-stable multivibrator 20 and also to the gates of silicon-controlled rectifiers 36 and 37 of the motor drive circuit by means of bi-stable multivibrator 32. The alternate firing of silicon-controlled rectifiers 14 and 15 causes power to be applied to the secondary winding 13 of transformer 11. The timing signals, pulses, are applied to the gates of silicon-controlled rectifiers 36 and 37 in such a manner as to cause each of these silicon-controlled rectifiers to fire for a complete 180°. In this mode the silicon-controlled rectifiers 36 and 37 merely function as diodes in a full wave rectifier circuit and apply maximum power to the motor 31. As the motor armature approaches its correct velocity the blade of switch 24 is thrown to contact 26 whereupon the digital tachometer 30 which is coupled to the shaft of motor 31 applies the alternate turn-on signals, pulses, to the gates of silicon-controlled rectifiers 14 and 15 of the inverter 10. The phase and frequency of inverter 10 now becomes a direct function of the position and velocity of the shaft of motor 31 which now synchronizes its velocity to the timing signals. If the motor shaft becomes heavily loaded the shaft position is retarded which retards the phase of the inverter output with respect to the timing signals, thus increasing the on-time of silicon-controlled rectifiers 14 and 15 which consequently increases the power to the motor thereby maintaining synchronism with the timing signals. Similarly, if the motor becomes lightly loaded the inverse will be true.

Although a specific embodiment of the invention has been shown and described, it will be understood that this is but illustrative and that various modifications may be made therein without departing from the spirit of the invention and the scope of the appended claims.

I claim:
1. A silicon-controlled rectifier phase locked servo drive comprising in combination, a silicon-controlled rectifier inverter, a first electronic switching means for alternately gating the silicon-controlled rectifiers of said inverter, timing means for triggering said first electronic switching means, a motor, a motor control circuit coupled to the output of said inverter, said motor control circuit consisting of a pair of silicon-controlled rectifiers connected in a full wave rectifier circuit across the output of said silicon-controlled rectifier inverter for supplying current to said motor, and a second electronic switching means coupled to the gates of said pair of silicon-controlled rectifiers, said second electronic switching means being triggered by said timing means.

2. A silicon-controlled rectifier phase locked servo drive comprising in combination, a silicon-controlled rectifier inverter, a first electronic switching means for alternately gating the silicon-controlled rectifiers of said inverter, switch means having first and second contacts coupled to the first electronic switching means, timing means for generating timing signals, said timing means triggering said first electronic switching means when connected to said first contact, a motor, a motor control circuit coupled to the output of said inverter, said motor control circuit consisting of a pair of silicon-controlled rectifiers connected in a full wave rectifier circuit across the output of said silicon-controlled rectifier inverter for supplying current to said motor, and a second electronic switching means coupled to the gates of said pair of silicon-controlled rectifiers for alternately gating said pair of rectifiers, said second electronic switching means being triggered by said timing means, and a digital tachometer coupled to the shaft of said motor for supplying alternate turn-on signals to the gates of the silicon-controlled rectifiers of the inverter when said switch means is thrown to said second contact coupling the output of the digital tachometer to said first electronic switching means whereby the phase and frequency of the inverter becomes a direct function of the position and velocity of the motor shaft which now synchronizes its velocity to the timing signals generated by said timing means.

3. A silicon-controlled rectifier phase locked servo drive comprising in combination, a silicon-controlled rectifier inverter, a first bi-stable multivibrator having its outputs coupled to the gates of the silicon-controlled rectifiers of said inverter in a manner for alternately gating said rectifiers, a switch means provided with a first and second contact connected to the input of said first bi-stable multivibrator, a reference timing generator for generating timing signals, the output of said generator when coupled to said first contact triggering said first bi-stable multivibrator whereby the silicon-controlled rectifiers of said inverter are alternately turned on, the power transformer of said inverter provided with an output winding having center and end taps, a first and second silicon-controlled rectifier comprising a full wave rectifier connected to said end taps, a motor having one of its terminals connected to said center tap and its other terminal connected to the cathodes of said first and second silicon-controlled rectifiers, a second bi-stable multivibrator, the gate of said first silicon-controlled rectifier connected to one output of said second bi-stable multivibrator and the gate of said second silicon-controlled rectifier connected to the other output of said second bi-stable multivibrator whereby said first and second silicon-controlled rectifiers are alternately turned on, the input of said second bi-stable multivibrator connected to and triggered by the timing signals of said reference timing generator, a digital tachometer mechanically coupled to the shaft of said motor for supplying alternate turn-on signals to the gates of the silicon-controlled rectifiers of the inverter when said switch means is thrown to said second contact coupling the output of the digital tachometer to said first bi-stable multivibrator whereby the phase and frequency of the inverter becomes a direct function of the position and velocity of the motor shaft which now synchronizes its velocity to the timing signals of said reference timing generator.

No references cited.

ORIS L. RADER, *Primary Examiner.*

J. J. BAKER, *Assistant Examiner.*